United States Patent
Taga

(10) Patent No.: US 10,414,934 B2
(45) Date of Patent: Sep. 17, 2019

(54) INK SET FOR INK-JET RECORDING, AND METHOD FOR PRODUCING INK SET FOR INK-JET RECORDING

(71) Applicant: Brother Kogyo Kabushiki Kaisha, Nagoya-shi, Aichi-ken (JP)

(72) Inventor: Yasuhiro Taga, Kani (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 220 days.

(21) Appl. No.: 15/417,321

(22) Filed: Jan. 27, 2017

(65) Prior Publication Data

US 2017/0218217 A1    Aug. 3, 2017

(30) Foreign Application Priority Data

Jan. 29, 2016  (JP) ................................. 2016-016358

(51) Int. Cl.
*C09D 11/40* (2014.01)
*C09D 11/322* (2014.01)
*C09D 11/326* (2014.01)

(52) U.S. Cl.
CPC ............ *C09D 11/40* (2013.01); *C09D 11/322* (2013.01); *C09D 11/326* (2013.01)

(58) Field of Classification Search
CPC ...... C09D 11/40; C09D 11/322; C09D 11/326
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 7,281,789 B2 | 10/2007 | Goto et al. | |
| 7,819,962 B2 | 10/2010 | Gu | |
| 7,922,805 B2 | 4/2011 | Kowalski et al. | |
| 8,016,404 B2 | 9/2011 | Kato et al. | |
| 8,858,695 B2 | 10/2014 | Gu et al. | |
| 9,034,091 B2 | 5/2015 | Matsuyama et al. | |
| 2004/0233263 A1 | 11/2004 | Goto et al. | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |
| 2012/0328853 A1 | 12/2012 | Matsuyama et al. | |
| 2012/0328854 A1 | 12/2012 | Matsuyama et al. | |
| 2016/0075880 A1 | 3/2016 | Gu et al. | |

FOREIGN PATENT DOCUMENTS

| | | |
|---|---|---|
| JP | H08-3498 A | 1/1996 |
| JP | 2000-513396 A | 10/2000 |
| JP | 2004-346160 A | 12/2004 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2011-184518 A | 9/2011 |
| JP | 2011-202152 A | 10/2011 |
| JP | 2012-213980 A | 11/2012 |

*Primary Examiner* — Peter D. Mulcahy

(74) *Attorney, Agent, or Firm* — Banner & Witcoff, Ltd.

(57) ABSTRACT

An ink set for ink-jet recording includes an achromatic color ink containing potassium ion and at least one of lithium ion and sodium ion; and a chromatic color ink containing at least one selected from the group consisting of: the potassium ion, the lithium ion and the sodium ion, wherein the ink set satisfies Condition (X): $K_a/(Li_a+Na_a+K_a)>0.7$, and Condition (Y): $K_c/(Li_c+Na_c+K_c)<0.6$.

15 Claims, 1 Drawing Sheet

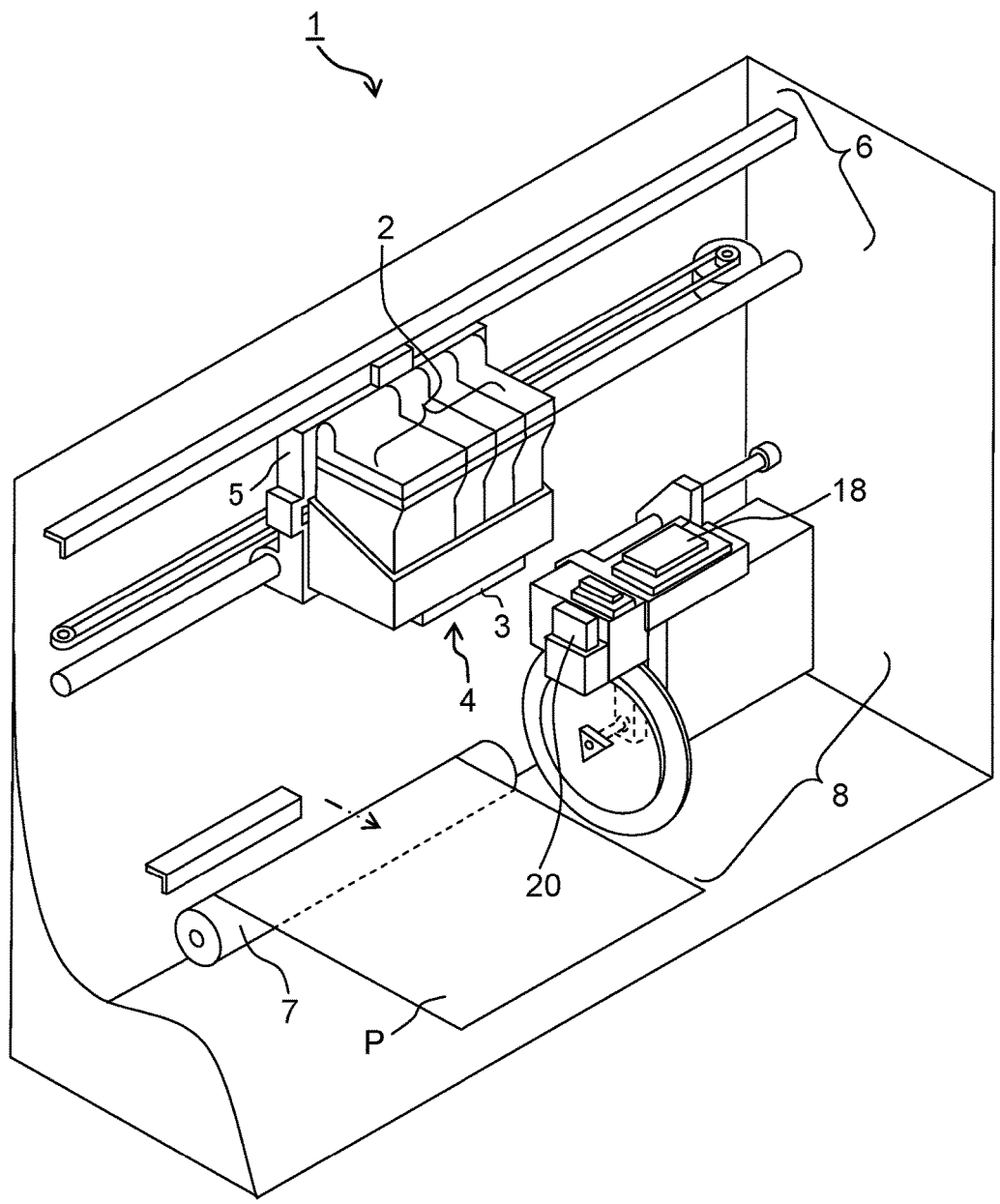

INK SET FOR INK-JET RECORDING, AND METHOD FOR PRODUCING INK SET FOR INK-JET RECORDING

CROSS REFERENCE TO RELATED APPLICATION

The present application claims priority from Japanese Patent Application No. 2016-016358 filed on Jan. 29, 2016, the disclosure of which is incorporated herein by reference in its entirety.

FIELD OF THE INVENTION

The present invention relates to an ink set for ink-jet recording, and a method for producing the ink set for ink-jet recording.

DESCRIPTION OF THE RELATED ART

Conventionally, there is known ink-jet recording for performing recording on a recoding medium by discharging (jetting) an achromatic color ink such as a black ink, etc., and a chromatic color ink such as a color ink, etc., onto the recording medium in an ink-jet system. In a case that an ink-jet recording of a color image is performed on the recording medium with the chromatic and achromatic color inks, a phenomenon so-called bleeding, in which an ink is blurred, is known to occur in some cases at the boundary portion, of the color image, between a recording portion formed by using the achromatic color ink and another recording portion formed by using the chromatic color ink. If the bleeding occurs as described above, the recording quality of the color image is lowered. There is proposed an ink set for ink-jet recording in which the content amount of a water-soluble solvent in each of the achromatic and chromatic color inks is adjusted so as to suppress the bleeding (see, for example, Japanese Patent Application Laid-open No. 2011-184518 corresponding to United States Patent Application Publication No. US2012/0328854 and Japanese Patent Application Laid-open No. 2011-202152 corresponding to United States Patent Application Publication No. US2012/0328853).

Regarding the ink set for ink-jet recording, there is a demand for a new method for effectively preventing the bleeding in (at) the boundary portion between the recording portion formed by using the achromatic color ink and the recording portion formed by using the chromatic color ink.

In view of the above situation, an object of the present teaching is to provide an ink set for ink-jet recording capable of effectively preventing the bleeding at the boundary portion between the recording portion formed by using the achromatic color ink and the recording portion formed by using the chromatic color ink.

SUMMARY

According to a first aspect of the present teaching, there is provided an ink set for ink-jet recording including:

an achromatic color ink containing potassium ion and at least one of lithium ion and sodium ion; and a chromatic color ink containing at least one selected from the group consisting of: the potassium ion, the lithium ion and the sodium ion, wherein the ink set satisfies the following conditions (X) and (Y):

$$K_a/(Li_a+Na_a+K_a)>0.7 \qquad \text{Condition (X):}$$

in the condition (X), $K_a$: concentration (ppm) of the potassium ion in the achromatic color ink, $Li_a$: concentration (ppm) of the lithium ion in the achromatic color ink, $Na_a$: concentration (ppm) of the sodium ion in the achromatic color ink; and $$K_c/(Li_c+Na_c+K_c)<0.6 \qquad \text{Condition (Y):}$$

in the condition (Y), $K_c$: concentration (ppm) of the potassium ion in the chromatic color ink, $Li_c$: concentration (ppm) of the lithium ion in the chromatic color ink, $Na_c$: concentration (ppm) of the sodium ion in the chromatic color ink.

According to a second aspect of the present teaching, there is provided a method for producing the ink set for ink-jet recording of the first aspect, the method including:

preparing an achromatic color ink so as to satisfy the condition (X);

measuring concentrations of potassium ion, lithium ion and sodium ion, respectively, in the prepared achromatic color ink;

preparing a chromatic color ink so as to satisfy the condition (Y);

measuring concentrations of the potassium ion, the lithium ion and the sodium ion, respectively, in the prepared chromatic color ink; and combining the achromatic color ink and the chromatic color ink.

BRIEF DESCRIPTION OF THE DRAWINGS

FIGURE is a perspective view schematically illustrating the configuration of an example of an ink-jet recording apparatus related to the present teaching.

DESCRIPTION OF THE PREFERRED EMBODIMENTS

In the present teaching, the term "achromatic color" refers, for example, to achromatic color except for the white color, and the term includes the black color and the gray color. Furthermore, the term "chromatic color" means the color other than the achromatic colors of white, black, and gray.

An explanation will be given about an ink set for ink-jet recording (hereinafter referred to as "ink set", in some cases) related to the present teaching. The ink set for ink-jet recording related to the present teaching includes an achromatic color ink and a chromatic color ink.

<Achromatic Color Ink>

Firstly, the achromatic color ink will be explained. The achromatic color ink contains a colorant of achromatic color, and a solvent. In the following, although the solvent is explained as being water, the solvent of the achromatic color ink is not limited to water. The colorant of the achromatic color is not particularly limited, and may be either an achromatic color pigment or an achromatic color dye. Further, it is also allowable to mix the achromatic color pigment and the achromatic color dye to be used as the colorant of the achromatic color.

The achromatic color pigment in not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by inorganic pigments based on carbon black, etc. The organic pigment is exemplified, for example, by aniline black daylight fluorescent pigment, etc. Further, any pigments different from those listed above can be used, provided that such pigments are soluble in water (water phase or aqueous phase). Specific examples of these pigments include, for example, C. I. Pigment Blacks 1, 6, and 7, etc. The achromatic color ink may be prepared by dispersing the achromatic color pigment in water, with a dispersant. As the dispersant, it is allowable to use a general resin dispersant, etc. Alternatively, in the achromatic color ink, the pigment of the achromatic color may be subjected to polymer capsulation.

The achromatic color pigment may be a self-dispersible pigment. The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the particles of the pigment by the chemical bond directly or with any group intervening therebetween. It is possible to use, as the self-dispersible pigments, a self-dispersible pigment wherein the pigment is subjected to a treatment by any one of methods described, for example, in Japanese Patent Application Laid-open No. HEI8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. US 2006/0201380 A1, Published Japanese Translation of PCT International Publication for Patent Application No. 2009-515007 corresponding to United States Patent Application Publications No. US 2007/0100023 A1, No. US 2007/0100024 A1 and No. US 2016/0075880 A1, Published Japanese Translation of PCT International Publication for Patent Application No. 2011-515535 corresponding to United States Patent Application Publication No. US 2009/0229489 A1, etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by MITSUBISHI CHEMICAL CORPORATION, etc. As the self-dispersible pigment, it is possible, for example, to use a commercially available product. The commercially available product includes, for example, "CAB-O-JET (trade name) 200", "CAB-O-JET (trade name) 300" and "CAB-O-JET (trade name) 400" produced by Cabot Corporation; "BONJET (trade name) BLACK CW-2" and "BONJET (trade name) BLACK CW-3" produced by ORIENT CHEMICAL INDUSTRIES, LTD.; "LIOJET (trade name) WD BLACK 002C" produced by TOYO INK SC HOLDINGS CO., LTD.; and the like.

The blending amount of the achromatic color pigment (achromatic color pigment solid content amount) in the entire amount of the achromatic color ink is not particularly limited, and may be appropriately determined based on, for example, a desired optical density, etc. The achromatic color pigment solid content amount is, for example, in a range of 0.1% by weight to 20% by weight, in a range of 1% by weight to 15% by weight, or in a range of 2% by weight to 10% by weight. It is allowable that only one kind of the achromatic color pigment as described above is used singly, or two or more kinds of the achromatic color pigment are used in combination.

The achromatic color dye is not particularly limited, and is exemplified, for example, by C.I. Direct Blacks 17, 19, 32, 51, 71, 108, 146, 154 and 168; C.I. Acid Blacks 2, 7, 24, 26, 31, 52, 63, 112 and 118; C.I. Basic Black 2; C.I. Food Blacks 1 and 2; and the like.

The blending amount of the achromatic color dye in the entire amount of the achromatic color ink is not particularly limited, and is, for example, in a range of 0.1% by weight to 20% by weight, in a range of 1% by weight to 15% by weight, or in a range of 2% by weight to 10% by weight. It is allowable that only one kind of the achromatic color dye as described above is used singly, or two or more kinds of the achromatic color dye are used in combination.

The water is preferably ion-exchanged water or pure water (purified water). The blending amount of the water in the entire amount of the achromatic color ink may be, for example, the balance of the other components.

The achromatic color ink further contains potassium ion and at least one of lithium ion and sodium ion. These ions may be contained in each of the components such as the colorant of achromatic color, etc., or may be intentionally added to the achromatic color ink.

The concentration of the potassium ion in the achromatic color ink is, for example, in a range of 50 ppm to 2000 ppm, in a range of 100 ppm to 1000 ppm, or in a range of 200 ppm to 500 ppm. The concentration of the potassium ion is the concentration in the final composition of the achromatic color ink, and this is similarly applicable to the concentration of the various kinds of ion to be described herein below. The concentration of the potassium ion can be measured, for example, with a commercially available cation chromatography apparatus. The concentration of the various kinds of ion, to be described hereinafter, can be also measured in a similar manner.

The concentration of the lithium ion in the achromatic color ink is, for example, in a range of 0 ppm to 2000 ppm, in a range of 0 ppm to 1000 ppm, or in a range of 0 ppm to 500 ppm.

The concentration of the sodium ion in the achromatic color ink is, for example, in a range of 0 ppm to 2000 ppm, in a range of 0 ppm to 1000 ppm, or in a range of 0 ppm to 500 ppm. Note that, however, either one of the concentration of the lithium ion and the concentration of the sodium ion in the achromatic color ink is not 0 ppm (is more than 0 ppm).

It is allowable that the potassium ion, the lithium ion and the sodium ion are the only ions contained in the achromatic color ink. Alternatively, the achromatic color ink may also contain another ion different from the potassium ion, the lithium ion and the sodium ion. Further, it is allowable that the potassium ion, the lithium ion and the sodium ion are the only metallic ions contained in the chromatic color ink. Alternatively, the chromatic color ink may also contain another metallic ion different from the potassium ion, the lithium ion and the sodium ion.

The achromatic color ink may further contain a surfactant. The surfactant is not particularly limited, and is exemplified, for example, by anionic surfactants produced by LION SPECIALTY CHEMICALS CO., LTD., including "LIPOLAN (trade name)" series, "LIPON (trade name)" series, "SUNNOL (trade name)" series, "LIPOTAC (trade name)" series, "ENAGICOL (trade name)" series, "LIPAL (trade name)" series, and "LOTAT (trade name)" series, etc.; anionic surfactants produced by KAO CORPORATION including "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series, etc.; anionic surfactants produced by SANYO CHEMICAL INDUSTRIES, LTD. including "SANDET (trade name)" series and "BEAULIGHT (trade name)" series, etc.; anionic surfactants produced by TOHO CHEMICAL INDUSTRY CO., LTD. including "ALSCOPE (trade name)" series, "NEOSCOPE (trade name)" series, "PHOSFANOL (trade name)" series, etc.; anionic surfactants produced by TOKYO CHEMICAL INDUSTRY CO., LTD. including sodium hexadecyl sulfate, sodium stearyl sulfate, etc.; and the like; nonionic surfactants produced by LION SPECIALTY CHEMICALS CO., LTD., including "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc.; nonionic surfactants produced by KAO CORPORATION, including "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series, etc.; nonionic surfactants produced by NISSHIN CHEMICAL CO., LTD., including "OLFIN (trade name)" series; and cationic surfactants produced by DAI-ICHI KOGYO SEIYAKU CO., LTD. including "KACHIOGEN (trade name)" series, etc. It is allowable that only one kind of the surfactant is used singly, or that two or more kinds of the surfactant are used in a mixed manner.

The achromatic color ink may further contain a water-soluble organic solvent. The water-soluble organic solvent is exemplified, for example, by a humectant which prevents the achromatic color ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, the humectant is preferably a polyvalent alcohol such as alkylene glycol, glycerol, etc.

The blending amount of the humectant in the entire amount of the achromatic color ink is, for example, in a range of 0% by weight to 95% by weight, in a range of 5% by weight to 80% by weight, or in a range of 5% by weight to 50% by weight.

The penetrant is not particularly limited, and is exemplified, for example, by glycol ether. The glycol ether is not particularly limited, and is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type of the penetrant may be used singly, or two or more kinds of the penetrant may be used in combination.

The blending amount of the penetrant in the entire amount of the achromatic color ink is, for example, in a range of 0% by weight to 20% by weight, in a range of 0% by weight to 15% by weight, or in a range of 1% by weight to 4% by weight.

The achromatic color ink may further contain a conventionally known additive, as necessary. The additive is not particularly limited, and is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The achromatic color ink can be prepared, for example, such that the achromatic colorant and water, and optionally other additive component(s) as necessary are mixed uniformly or homogeneously by any conventionally known method, and undissolved matters are removed by a filter or the like. In a case that the pigment is used as the colorant, it is allowable to obtain an achromatic color ink, for example, by (i) at first, preparing an aqueous pigment dispersion in which the pigment is dispersed in water; (ii) mixing components (water, a water-soluble organic solvent, and any additional component as necessary), which are different from the aqueous pigment dispersion, uniformly or homogeneously to thereby prepare an ink solvent; (iii) next, adding the ink solvent to the aqueous pigment dispersion and mixing the mixture uniformly or homogeneously with a conventionally known method; and (iv) finally, removing any undissolved matters by a filter or the like.

An example of the achromatic color ink may be exemplified by a water-based black ink containing a self-dispersible carbon black, a surfactant and water.

The total sum of the concentration of the potassium ion, the concentration of the lithium ion and the concentration of the sodium ion in the water-based black ink is, for example, in a range of 50 ppm to 2000 ppm, in a range of 100 ppm to 1000 ppm, or in a range of 200 ppm to 500 ppm.

A method for adjusting the concentrations of the potassium ion, the lithium ion and the sodium ion, respectively (hereinafter referred to also as the "respective ion concentrations" or the "respective concentrations of the ions"), in the achromatic color ink will be explained. For example, in a case that the pigment is used as the colorant, it is allowable that in the above-described step (i) of preparing the aqueous pigment dispersion, the respective concentrations of the ions in the aqueous pigment dispersion may be adjusted such that a finally obtained ink (achromatic color ink) satisfies the above-described condition (X). Namely, it is allowable to produce the achromatic color ink by using an aqueous pigment dispersion in which the respective concentrations of the potassium ion, the lithium ion and the sodium ion are adjusted. For example, in a case that the pigment is a self-dispersible pigment, it is allowable to adjust the respective ion concentrations by selecting a counter ion of the carboxylic acid group, etc., introduced into the surfaces of the particles of the pigment. Alternatively, in a case that a dispersant is used to disperse the pigment, it is allowable to adjust the respective ion concentrations by selecting a neutralizer (counteragent) for carboxylic acid group, etc., contained in the dispersant.

Further, in a step different from the step (i) of preparing the aqueous pigment dispersion, the respective ion concentrations may be adjusted. For example, it is allowable to adjust the respective ion concentrations by adding a metallic salt, etc. In the achromatic color ink, since it is preferred that the concentration of the potassium ion is high, from the viewpoint of satisfying the above-described condition (X), it is allowable to add the potassium ion to the achromatic color ink. In a case that the achromatic color ink is mass-produced, it is preferred that the potassium ion concentration is adjusted by adding the potassium ion to the achromatic color ink, from the viewpoint of suppressing any unevenness or variation in the potassium concentrations. Furthermore, in a case that the dye is used as the colorant, it is allowable to adjust the respective ion concentrations by selecting a counter ion of carboxylic acid group, etc., contained in the dye.

Note that regarding commercially available colorants, even when the color index numbers thereof are same, the concentrations of the ions contained in the commercially available products vary for the respective manufacturers, in some cases, due to the differences in the method for producing the colorant and/or the kinds of the counter ions of dye among the manufacturers. This is similarly applicable to other component(s) different from the colorant. It is preferred to measure the respective concentrations of the potassium ion, the lithium ion and the sodium ion in the achromatic color ink after the achromatic color ink has been prepared, and to confirm whether or not the condition (X) is satisfied in the prepared achromatic color ink.

<Chromatic Color Ink>

Next, the chromatic color ink will be explained. In the ink set related to the present teaching, the chromatic color ink may be only one chromatic color ink, or may include two or more chromatic color inks, but preferably includes at least chromatic color inks of the three primary colors (yellow ink, magenta ink and cyan ink). The chromatic color ink contains a chromatic colorant and a solvent. In the following, although the solvent is explained as being water, the solvent of the chromatic color ink is not limited to water. The colorant of the chromatic color is not particularly limited, and may be either a chromatic color pigment or a chromatic color dye. Further, a mixture of a chromatic color pigment and a chromatic color dye may be used as the chromatic colorant.

The chromatic color pigment is not particularly limited and is exemplified, for example, by an inorganic pigment, an organic pigment, etc. The inorganic pigment includes, for example, inorganic pigments based on iron oxide, etc. The organic pigment includes, for example, azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment, etc.; nitro pigments; nitroso pigments; and the like. Any other pigment is also usable provided that the pigment is dispersible in a water phase (aqueous phase). Specific example of the pigments as described above include, for example, C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 155, 180, 185, 194 and 213; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224 and 238; C. I. Pigment Violet 19 and 196; C. I. Pigment Blues 1, 2, 3, 15, 15:1, 15:2, 15:3, 15:4, 15:6, 16, 22 and 60; C. I. Pigment Greens 7 and 36; solid solutions of the above-listed pigments; and the like. For example, the solid solution may contain two or more kinds of the above-described chromatic color pigment. For example, in a case that the chromatic color ink is the magenta ink, the solid solution may contain two kinds of pigment that are C.I. Pigment Red 122 and C.I. Pigment Violet 19, or may contain two kinds of pigment that are C.I. Pigment Red 202 and C.I. Pigment Violet 19. In the former case, although there is no particular limitation, the weight ratio (X:Y) of the C.I. Pigment Red 122 (X) and C.I. Pigment Violet 19 (Y) is, for example, in a range of X:Y=1:0.1 to 1:10. In the latter case, although there is no particular limitation, the weight ratio (Z:Y) of the C.I. Pigment Red 202 (Z) and C.I. Pigment Violet 19 (Y) is, for example, in a range of Z:Y=1:0.1 to 1:10. The chromatic color ink may be prepared by dispersing the chromatic color pigment in water with a dispersant. As the dispersant, it is allowable to use, for example, a general resin dispersant, etc. Alternatively, in the chromatic color ink, the chromatic color pigment may be subjected to polymer capsulation.

The chromatic color pigment may be a self-dispersible pigment. It is possible to use, as a material for the self-dispersible pigment, either one of the inorganic pigment and the organic pigment. As the self-dispersible pigment, it is possible, for example, to use a commercially available product. The commercially available product is exemplified, for example, by "CAB-O-JET (trade name) 250C", "CAB-O-JET (trade name) 260M", "CAB-O-JET (trade name) 270Y", "CAB-O-JET (trade name) 450C", "CAB-O-JET (trade name) 465M", and "CAB-O-JET (trade name) 470Y" produced by Cabot Corporation; and the like.

The blending amount of the chromatic color pigment (chromatic color pigment solid content amount) in the entire amount of the chromatic color ink is not particularly limited, and may be appropriately determined based on, for example, a desired color (chromaticness, hue, tint), etc. The chromatic color pigment solid content amount is, for example, in a range of 0.1% by weight to 20% by weight, in a range of 1% by weight to 15% by weight, or in a range of 2% by weight to 10% by weight. It is allowable that only one kind of the chromatic color pigment as described above is used singly, or two or more kinds of the chromatic color pigment are used in combination.

The chromatic color dye is not specifically limited, and is exemplified, for example, by C. I. Direct Blues 6, 22, 25, 71, 86, 90, 106 and 199; C. I. Direct Reds 1, 4, 17, 28, 83 and 227; C. I. Direct Yellows 12, 24, 26, 86, 98, 132, 142 and 173; C. I. Direct Oranges 34, 39, 44, 46 and 60; C. I. Direct Violets 47 and 48; C. I. Direct Brown 109; C. I. Direct Green 59; C. I. Acid Blues 9, 22, 40, 59, 93, 102, 104, 117, 120, 167, 229 and 234; C. I. Acid Reds 1, 6, 32, 37, 51, 52, 80, 85, 87, 92, 94, 115, 180, 256, 289, 315 and 317; C. I. Acid Yellows 11, 17, 23, 25, 29, 42, 61 and 71; C. I. Acid Oranges 7 and 19; C. I. Acid Violet 49; C. I. Basic Blues 1, 3, 5, 7, 9, 24, 25, 26, 28 and 29; C. I. Basic Reds 1, 2, 9, 12, 13, 14 and 37; C. I. Basic Violets 7, 14 and 27; and the like.

The blending amount of the chromatic color dye in the entire amount of the chromatic color ink is not particularly limited, and is, for example, in a range of 0.1% by weight to 20% by weight, in a range of 1% by weight to 15% by weight, or in a range of 2% by weight to 10% by weight. It is allowable that only one kind of the chromatic color dye as described above is used singly, or two or more kinds of the chromatic color dye are used in combination.

The water is preferably ion-exchanged water or pure water (purified water). The blending amount of the water in the entire amount of the chromatic color ink may be, for example, the balance of the other components.

The chromatic color ink further contains at least one selected from the group consisting of potassium ion, lithium ion and sodium ion. These ions may be contained in each of the components such as the colorant of chromatic color, etc., or may be intentionally added to the chromatic color ink.

The concentration of the potassium ion in the chromatic color ink is, for example, in a range of 0 ppm to 2000 ppm, in a range of 0 ppm to 1000 ppm, or in a range of 0 ppm to 500 ppm.

The concentration of the lithium ion in the chromatic color ink is, for example, in a range of 0 ppm to 2000 ppm, in a range of 0 ppm to 1000 ppm, or in a range of 0 ppm to 500 ppm.

The concentration of the sodium ion in the chromatic color ink is, for example, in a range of 0 ppm to 2000 ppm, in a range of 0 ppm to 1000 ppm, or in a range of 0 ppm to 500 ppm. Note that, however, not all the concentration of the potassium ion, the concentration of the lithium ion and the concentration of the sodium ion in the chromatic color ink are 0 ppm.

It is allowable that the potassium ion, the lithium ion and the sodium ion are the only ions contained in the chromatic color ink. Alternatively, the chromatic color ink may also contain another ion different from the potassium ion, the lithium ion and the sodium ion. Further, it is allowable that the potassium ion, the lithium ion and the sodium ion may be the only metallic ions contained in the chromatic color ink. Alternatively, the chromatic color ink may also contain another metallic ion different from the potassium ion, the lithium ion and the sodium ion.

The chromatic color ink may further contain a surfactant, a water-soluble organic solvent and an additive, similarly to the achromatic color ink.

The chromatic color ink can be prepared, for example, such that the chromatic colorant and water, and optionally other additive component(s) as necessary are mixed uniformly or homogeneously by any conventionally known method, and undissolved matters are removed by a filter or the like.

The chromatic color ink may be exemplified, for example, by a combination of: a water-based yellow ink containing a yellow pigment, a resin dispersant, a surfactant and water; a water-based magenta ink containing a magenta pigment, a resin dispersant, a surfactant and water; and a water-based cyan ink containing a cyan pigment, a resin dispersant, a surfactant and water.

As the resin dispersant, it is allowable to use a general polymeric dispersant, and to use a commercially available product. Examples of the commercially available product include "JOHNCRYL (trade name) 611", "JOHNCRYL (trade name) 60", "JOHNCRYL (trade name) 586", "JOHNCRYL (trade name) 687", "JOHNCRYL (trade name) 63", and "JOHNCRYL (trade name) HPD296" produced by BASF CORPORATION; "Disperbyk (trade name) 190" and "Disperbyk (trade name) 191" produced by BYK ADDITIVES & INSTRUMENTS; "SOLSPERSE (trade name) 20000" and "SOLSPERSE (trade name) 27000" produced by ZENECA; and the like.

The total sum of the concentration of the potassium ion, the concentration of the lithium ion and the concentration of the sodium ion in the water-based yellow ink is, for example, in a range of 50 ppm to 2000 ppm, in a range of 100 ppm to 1000 ppm, or in a range of 200 ppm to 500 ppm.

The total sum of the concentration of the potassium ion, the concentration of the lithium ion and the concentration of the sodium ion in the water-based magenta ink is, for example, in a range of 50 ppm to 2000 ppm, in a range of 100 ppm to 1000 ppm, or in a range of 200 ppm to 500 ppm.

The total sum of the concentration of the potassium ion, the concentration of the lithium ion and the concentration of the sodium ion in the water-based cyan ink is, for example, in a range of 50 ppm to 2000 ppm, in a range of 100 ppm to 1000 ppm, or in a range of 200 ppm to 500 ppm.

A method of adjusting the respective concentrations of the potassium ion, the lithium ion and the sodium ion in the chromatic color ink is similar to the method of adjusting the respective concentrations of the potassium ion, the lithium ion and the sodium ion in the achromatic color ink. Further, in the chromatic color ink, it is preferred that the concentration of the potassium ion is relatively low, from the viewpoint of satisfying the condition (Y). In order to lower the concentration of the potassium ion to be relatively low, the lithium ion and/or the sodium ion may be added to the chromatic color ink. It is preferred to measure the respective concentrations of the potassium ion, the lithium ion and the sodium ion in the chromatic color ink after the chromatic color ink has been prepared, and to confirm whether or not the condition (Y) is satisfied.

Under a condition that the total sum of the concentration of the potassium ion, the concentration of the lithium ion and the concentration of the sodium ion in each of the water-based black ink, the water-based yellow ink, the water-based magenta ink and the water-based cyan ink is in the range of 50 ppm to 2000 ppm, it is possible to effectively prevent the bleeding from occurring between the achromatic color ink (the water-based black ink) and any one of the water-based chromatic color inks (the water-based yellow ink, the water-based magenta ink and the water-based cyan ink). Under a condition that the above-described total sum of the concentrations of the three kinds of ions is less than the above-described range, the electrostatic characteristic (to be described later on; relative cationic characteristic, or relative anionic characteristic) of each of the water-based inks is lowered, which in turn brings about such a fear that the effect of suppressing the bleeding between the respective inks might be lowered. On the other hand, under a condition that the above-described total sum of the concentrations of the three kinds of ions is more than the above-described range, there is such a fear that the dispersion stability or the dissolution stability of the colorant might be lowered.

The ink set related to the present teaching satisfies the above-described conditions (X) and (Y). With this, the ink set related to the present teaching is capable of effectively prevent the bleeding from occurring at the boundary portion between a recording portion formed by using the achromatic color ink and a recording portion formed by using the chromatic color ink. The mechanism of exhibiting the effect of suppressing the bleeding related to the present teaching is presumed, for example, as follows. Namely, the potassium ion has ionic radius greater than those of the lithium ion and the sodium ion, and thus exhibits stronger cationic characteristic than those of the lithium ion and the sodium ion.

Accordingly, by increasing the ratio occupied by the potassium ion in the total amount of the potassium ion, the lithium ion and the sodium ion in the achromatic color ink so as to satisfy the condition (X) and by lowering this ratio in the chromatic color ink so as to satisfy the condition (Y), then between the achromatic and chromatic color inks, the achromatic color ink exhibits the characteristic which is relatively more cationic and the chromatic color ink exhibits the characteristic which is relatively more anionic. As a result, in a case that the achromatic color ink and the chromatic color ink are brought into contact with each other on a recording medium such as recording paper (recording sheet), the achromatic color ink and the chromatic color ink hardly mix with each other due to the difference in the characteristics thereof, and this is presumed to realize the effective prevention of the bleeding. This mechanism, however, is merely a presumption, and the present teaching is not limited to and restricted by this presumed mechanism.

In the ink set related to the present teaching, it is preferred that the following conditions (X1) and (Y1) are satisfied. In a case that the condition (X1) and the condition (Y1) are satisfied, it is possible to prevent the bleeding at the boundary portion between the recording portion formed by using the achromatic color ink and the recording portion formed by using the chromatic color ink, more effectively.

$$K_a/(Li_a+Na_a+K_a)>0.8 \quad \text{Condition (X1):}$$

in the condition (X1), $K_a$: the concentration (ppm) of the potassium ion in the achromatic color ink, $Li_a$: the concentration (ppm) of the lithium ion in the achromatic color ink, $Na_a$: the concentration (ppm) of the sodium ion in the achromatic color ink; and $$K_c/(Li_c+Na_c+K_c)<0.5 \quad \text{Condition (Y1):}$$

in the condition (Y1), $K_c$: the concentration (ppm) of the potassium ion in the chromatic color ink, $Li_c$: the concentration (ppm) of the lithium ion in the chromatic color ink, $Na_c$: the concentration (ppm) of the sodium ion in the chromatic color ink.

Further, it is preferred that the ink set satisfies the following condition (X2).

$$K_a/(Li_a+Na_a+K_a)>0.9 \quad \text{Condition (X2):}$$

in the condition (Y1), $K_a$: the concentration (ppm) of the potassium ion in the achromatic color ink, $Li_a$: the concentration (ppm) of the lithium ion in the achromatic color ink, $Na_a$: the concentration (ppm) of the sodium ion in the achromatic color ink.

The ratio occupied by the potassium ion in the total amount of the potassium ion, lithium ion and sodium ion in the achromatic color ink, as indicated in the conditions (X) to (X2), is referred to as "Ra" appropriately in the following description. Namely, Ra is represented by the following formula (1). Although the upper limit value of Ra is not particularly limited, Ra is substantially less than 0.95, namely, Ra<0.95.

$$Ra=K_a/(Li_a+Na_a+K_a) \quad \text{formula (1):}$$

in the formula (1), $K_a$: the concentration (ppm) of the potassium ion in the achromatic color ink, $Li_a$: the concentration (ppm) of the lithium ion in the achromatic color ink, and $Na_a$: the concentration (ppm) of the sodium ion in the achromatic color ink.

The ratio occupied by the potassium ion in the total amount of the potassium ion, lithium ion and sodium ion in the chromatic color ink, as indicated in the conditions (Y) and (Y1), is referred to as "Rc" appropriately in the following description. Namely, Rc is represented by the following formula (2). Although the lower limit value of Rc is not particularly limited, Rc is substantially is more than 0.01, namely, Rc>0.01.

$$Rc=K_c/(Li_c+Na_c+K_c) \quad \text{formula (2):}$$

in the formula (2), $K_c$: the concentration (ppm) of the potassium ion in the chromatic color ink, $Li_c$: the concentration (ppm) of the lithium ion in the chromatic color ink, and $Na_c$: the concentration (ppm) of the sodium ion in the chromatic color ink.

As described above, under a condition that the ratio (Ra) occupied by the potassium ion in the total amount of the potassium ion, lithium ion and sodium ion in the achromatic color ink is made to be high, and that the ratio (Rc) occupied by the potassium ion in the total amount of the potassium ion, lithium ion and sodium ion in the chromatic color ink is made to be low, the bleeding can be suppressed effectively. Thus, from the viewpoint of preventing the bleeding, the ink set preferably further satisfies the following condition (A) and more preferably further satisfies the following condition (A1).

$$Ra/Rc>1.2 \quad \text{Condition (A):}$$

$$Ra/Rc>2.0 \quad \text{Condition (A1):}$$

Although the upper limit value of (Ra/Ac) in each of the conditions (A) and (A1) is not particularly limited, (Ra/Ac) is substantially is less than 30, namely, (Ra/Ac)<30. When the ink set satisfies the condition (A) or (A1), Rc is not 0, namely, the concentration (Kc) of the potassium ion in the chromatic color ink is not 0 ppm.

In a case that the ink set related to the present teaching contains a plurality of chromatic color inks, at least one of the plurality of chromatic color inks satisfies the above-described condition (Y). Further, from the viewpoint of the preventing the bleeding, it is preferred that all the plurality of chromatic color ink each satisfy the above-described condition (Y). For example, in an ink set including a black ink, a yellow ink, a magenta ink and a cyan ink, it is preferred that the black ink satisfies the above-described condition (X) and that the yellow, magenta and cyan inks satisfy the above-described condition (Y). This is similarly applicable also to the other conditions (Y1), (A) and (A1).

In the ink set related to the present teaching, two or more chromatic color inks may be contained as the chromatic color ink; in the condition (Y) or the condition (Y1), and similarly in the formula (2), $K_c$ may be total sum of the concentrations (ppm) of the potassium ion in the two or more chromatic color inks; $Li_c$ may be a total sum of the concentrations (ppm) of the lithium ion in the two or more chromatic color inks; and $Na_c$ may be a total sum of the concentrations (ppm) of the sodium ion in the two or more chromatic color inks. In this case, the ink set related to the present teaching can be considered as an ink set for ink-jet recording including an achromatic color ink, and two or more chromatic color inks, wherein the achromatic color ink contains potassium ion and at least one of lithium ion and sodium ion; the chromatic color ink contains at least one selected from the group consisting of: the potassium ion, the lithium ion and the sodium ion; and the following condition (X) and the following condition (Z) or (Z1) are satisfied. In this aspect, even in a case that the chromatic color inks are used in a mixed manner (namely, the two or more chromatic color inks are mixed), it is possible to effectively prevent the bleeding between the mixed chromatic color inks and the achromatic color ink. In the present teaching, a recording portion formed by mixing the two or more chromatic color inks may be a chromatic color, or an achromatic color (for example, gray composed by mixing the yellow, magenta and cyan inks, etc.).

$$K_a/(Li_a+Na_a+K_a)>0.7 \quad \text{Condition (X):}$$

in the condition (X), $K_a$: the concentration (ppm) of the potassium ion in the achromatic color ink, $Li_a$: the concentration (ppm) of the lithium ion in the achromatic color ink, $Na_a$: the concentration (ppm) of the sodium ion in the achromatic color ink; and $$K_{ct}/(Li_{ct}+Na_{ct}+K_{ct})<0.6 \quad \text{Condition (Z):}$$

in the condition (Z), $K_{ct}$: the total sum of concentrations (ppm) of the potassium ion in the two or more chromatic color inks, $Li_{ct}$: the total sum of concentrations (ppm) of the lithium ion in the two or more chromatic color inks, and $Na_{ct}$: the total sum of concentrations (ppm) of the sodium ion in the two or more chromatic color inks; and $$K_{ct}/(Li_{ct}+Na_{ct}+K_{ct})<0.5 \quad \text{Condition (Z1):}$$

in the condition (Z1), $K_{ct}$: the total sum of concentrations (ppm) of the potassium ion in the two or more chromatic color inks, $Li_{ct}$: the total sum of concentrations (ppm) of the lithium ion in the two or more chromatic color inks, and $Na_{ct}$: the total sum of concentrations (ppm) of the sodium ion in the two or more chromatic color inks.

Next, an explanation will be given about an ink-jet recording apparatus related to the present teaching.

The ink-jet recording apparatus related to the present teaching is an ink-jet recording apparatus characterized by including: an ink accommodating section configured to accommodate an ink therein; and an ink jetting mechanism configured to jet the ink accommodated in the ink accommodating section; wherein the ink accommodated in the ink accommodating section includes the achromatic color ink and the chromatic color ink constructing the ink set for ink-jet recording related to the present teaching.

FIGURE depicts an exemplary configuration of the ink-jet recording apparatus related to the present teaching. As depicted in FIGURE, an ink-jet recording apparatus 1 related to the present teaching includes four ink cartridges 2, an ink jetting mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. For example, the water-based black ink is the achromatic color ink related to the present teaching, and at least one of the water-based yellow ink, the water-based magenta ink and the water-based cyan ink is the chromatic color ink related to the present teaching. Further, it is preferred that all the water-based yellow, magenta and cyan inks are the chromatic color inks related to the present teaching. Although the set including the four ink cartridges 2 is indicated in this embodiment as an example, it is allowable to use an ink cartridge of an integrated type of which inner portion is partitioned so as to define a water-base yellow ink accommodating portion, a water-base magenta ink accommodating portion, a water-base cyan ink accommodating portion and a water-base black ink accommodating portion. As the main body of the ink cartridge (ink cartridge body), it is allowable to use, for example, a conventionally known ink cartridge body.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821 corresponding to United States Patent Application Publication No. US2008/0241398). The platen roller 7 extends in the reciprocating direction of the carriage 5 and is arranged to face the ink-jet head 3.

The purge device 8 sucks or draws unsatisfactory ink (poor ink) which contains air bubbles, etc. accumulated or trapped inside the ink-jet head 3. As the purge device 8, it is possible to use, for example, a conventionally known purge device (see, for example, Japanese Patent Application Laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIGURE, a cap 18 is provided to cover a plurality of nozzles of the ink-jet head 3 which is returned to a reset position upon completion of the recording, so as to prevent the water-based inks from drying.

In the ink-jet recording apparatus 1 of this embodiment, the four ink cartridges 2 are provided, together with the head unit 4, on one carriage 5. However, the present teaching is not limited to this. In the ink-jet recording apparatus 1, the respective four cartridges 2 may be provided on a carriage which is different (separate) from the carriage on which the head unit 4 is provided. Alternatively, the respective four cartridges 2 may be arranged and fixed inside the ink-jet recording apparatus 1, rather than being provided on the carriage 5. In such aspects, for example, each of the four cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles may be provided with an inlet port via which the ink is poured from the outside to the inside of the ink bottle.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. The recording paper P after the recording is discharged from the ink-jet recording apparatus 1. According to the present teaching, it is possible to obtain a recording matter in which the bleeding at the boundary portion between a recorded portion formed by using the achromatic color ink and a recording portion formed by using the chromatic color ink is effectively prevented. In FIGURE, the paper feeding mechanism and paper discharge mechanism for the recording paper P are omitted.

In the apparatus depicted in FIGURE, an ink-jet head of serial type (serial type ink-jet head) is adopted. The present teaching, however, is not limited to this. The ink-jet recording apparatus may be an apparatus adopting an ink-jet head of line type (line type ink-jet head).

Next, an ink-jet recording method related to the present teaching is an ink-jet recording method including jetting inks, composing an ink set, onto a recording medium in the ink-jet system, wherein the ink set is the ink set for ink-jet recording related to the present teaching. The recording includes printing a letter (text), printing an image, printing, etc.

Next, an explanation will be given about a selecting method for selecting inks for ink-jet recording related to the present teaching. The selecting method for selecting the inks for ink-jet recording related to the present teaching is a selecting method for selecting inks for ink-jet recording which compose an ink set for ink-jet recording, the ink set including an achromatic color ink and a chromatic color ink, the achromatic color ink containing potassium ion and at least one of lithium ion and sodium ion, and the chromatic color ink containing at least one selected from the group consisting of: the potassium ion, the lithium ion and the sodium ion, the selecting method including:

a measuring step of measuring concentration of the potassium ion, concentration of the lithium ion and concentration of the sodium ion in each of the achromatic and chromatic color inks; and a selecting step of selecting the achromatic color ink and the chromatic color ink so as to satisfy the above-described conditions (X) and (Y).

According to the selecting method related to the present teaching, by measuring the concentration of the potassium ion, the concentration of the lithium ion and the concentration of the sodium ion in each of the achromatic and chromatic color inks, and by selecting the achromatic color ink and the chromatic color ink so as to satisfy the above-described conditions (X) and (Y), it is possible to select, quite easily, the achromatic color ink and the chromatic color ink which are capable of effectively preventing the bleeding at the boundary portion between the recording portion formed by using the achromatic color ink and the recording portion formed by using the chromatic color ink. The other conditions, other than the above condition, of the selecting method for selecting the inks for ink-jet recording related to the present teaching are same as those of the ink set for ink-jet recording related to the present teaching.

Next, an explanation will be given about a producing method for producing an ink set for ink-jet recording related to the present teaching. The producing method for producing the ink set for ink-jet recording related to the present teaching is a producing method for producing an ink set for ink-jet recording including an achromatic color ink and a chromatic color ink, the producing method including:

previously selecting, by the selecting method for selecting the inks for ink-jet recording related to the present teaching, an achromatic color ink and a chromatic color ink, so as to satisfy the above-described conditions (X) and (Y); and combining the achromatic color ink and the chromatic color ink in accordance with the selecting.

According to the producing method for producing the ink set for ink-jet recording related to the present teaching, by previously selecting, by the selecting method for selecting the inks for ink-jet recording related to the present teaching, the achromatic color ink and the chromatic color ink, it is possible to obtain, quite easily, the ink set for ink-jet recording which is capable of effectively preventing the bleeding at the boundary portion between the recording portion formed by using the achromatic color ink and the recording portion formed by using the chromatic color ink. The other conditions, other than the above condition, of the producing method for producing the ink set for ink-jet recording related to the present teaching are same as those of the ink set for ink-jet recording related to the present teaching.

Next, an explanation will be made about a bleeding suppressing method for suppressing bleeding related to the present teaching. The bleeding suppressing method related to the present teaching is a bleeding suppressing method for suppressing bleeding in ink-jet recording using an ink set, wherein the ink set is the ink set for ink-jet recording related to the present teaching.

As described above, according to the present teaching, it is possible to effectively prevent the bleeding at the boundary portion between the recording portion formed by using the achromatic color ink and the recording portion formed by using the chromatic color ink, by allowing the ratio occupied by the potassium ion in the total amount of the potassium ion, lithium ion and sodium ion in the achromatic color ink to satisfy the condition (X), and by allowing the ratio occupied by the potassium ion in the total amount of the potassium ion, lithium ion and sodium ion in the chromatic color ink to satisfy the condition (Y).

EXAMPLES

Next, examples related to the present teaching will be explained together with comparative examples. Note that the present teaching is not limited by and is not restricted to the examples and the comparative examples which will be described below.

<Preparation of Achromatic Color Inks Using Pigment>

Components, except for the self-dispersible carbon black, which were included in Achromatic Color Ink Composition (TABLE 1, as indicated below) were mixed uniformly or homogeneously; and thus an ink solvent was obtained. Subsequently, the ink solvent was added to the self-dispersible carbon black dispersed in water, followed by being mixed uniformly, and thus a mixture was obtained. After that, the obtained mixture was filtrated through a cellulose acetate membrane filter (pore size 3.00 µm) produced by TOYO ROSHI KAISHA, LTD., and thus achromatic color inks Bk-1a to Bk-1j, Bk-2a, Bk-2b and Bk-3 each using the pigment and indicated in TABLE 1 were obtained.

<Preparation of Achromatic Color Inks Using Dye>

Components which were included in Achromatic Color Ink Composition (TABLE 1, as indicated below) were mixed uniformly or homogeneously; and thus a mixture was obtained. After that, the obtained mixture was filtrated through a hydrophilic polytetrafluoroethylene (PTFE) type membrane filter (pore diameter: 0.20 µm) produced by TOYO ROSHI KAISHA, LTD., and thus achromatic color inks Bk-4a and Bk-4b each using the dye and indicated in TABLE 1 were obtained.

TABLE 1 (following)—LEGEND

*1: Self-dispersible carbon black; produced by Cabot Corporation.
*2: Self-dispersible carbon black; produced by Cabot Corporation.
*3: Surfactant produced by NISSHIN CHEMICAL CO., LTD.
*4: Surfactant produced by NISSHIN CHEMICAL CO., LTD.
*5: Surfactant produced by LION SPECIALTY CHEMICALS CO., LTD.
*K: Intentionally added with the potassium ion.
*L: Intentionally added with the lithium ion.
*N: Intentionally added with the sodium ion.

Numerals in the table indicate the solid content amount for the self-dispersible carbon black, and indicate the active ingredient amount for the surfactant.

<Preparation of Aqueous Pigment Dispersion>

Aqueous pigment dispersions 1, 3, 4 and 6-10 in each of which a pigment was dispersed in water by a dispersant were prepared by the following method. Pure water (purified water) was added to 20% by weight of each of pigments indicated in TABLES 2 to 4 as indicated below and 5.0% by weight of a resin dispersant (acrylic acid-acrylic acid ester copolymer) so that the entire amount thereof was 100% by weight, followed by being agitated and mixed, and thus a mixture was obtained. The obtained mixture was placed in a wet sand mill charged with zirconia beads of which diameter was 0.3 mm, and was subjected to a dispersing process for 6 hours. Afterwards, the zirconia beads were removed by a separator, and the mixture was filtrated through a cellulose acetate filter (pore size 3.00 μm). Thus, aqueous pigment dispersions 1, 3, 4 and 6 to 10 indicated in TABLES 2 to 4 were obtained.

Further, the pigments as indicated in TABLEs 2 to 4 were processed by a method described in Published Japanese Translation of PCT International Publication for Patent Application No. 2009-515007 (corresponding to United

TABLE 1

| | | Bk-1a | Bk-1b | Bk-1c | Bk-1d | Bk-1e | Bk-1f | Bk-1g | Bk-1h | Bk-1i | Bk-1j |
|---|---|---|---|---|---|---|---|---|---|---|---|
| Composition of Achromatic Color Ink (% by weight) | CAB-O-JET (trade name) 200 (*1) | | | | | 8.00 | | | | | |
| | CAB-O-JET (trade name) 300 (*2) | | | | | — | | | | | |
| | C.I. Food Black 2 | | | | | — | | | | | |
| | Glycerol | | | | | 14.00 | | | | | |
| | Triethylene glycol | | | | | 4.00 | | | | | |
| | Triethylene glycol-n-butyl ether | | | | | 3.00 | | | | | |
| | Dipropylene glycol-n-propyl ether | | | | | — | | | | | |
| | OLFIN (trade name) E1004 (*3) | | | | | 0.30 | | | | | |
| | OLFIN (trade name) E1010 (*4) | | | | | — | | | | | |
| | SUNNOL (trade name) NL-1430 (*5) | | | | | 0.50 | | | | | |
| | Water | | | | | balance | | | | | |
| | $K_a$ (ppm) | 307 | 307 | 370 (*K) | 450 (*K) | 307 | 307 | 307 | 400 (*K) | 307 | 307 |
| | $Li_a$ (ppm) | 0 | 80 (*L) | 0 | 0 | 30 (*L) | 0 | 379 (*L) | 0 | 0 | 121 (*L) |
| | $Na_a$ (ppm) | 38 | 38 | 38 | 38 | 56 (*N) | 58 (*N) | 38 | 38 | 442 (*N) | 38 |

| | | Bk-2a | Bk-2b | Bk-3 | Bk-4a | Bk-4b |
|---|---|---|---|---|---|---|
| Composition of Achromatic Color Ink (% by weight) | CAB-O-JET (trade name) 200 (*1) | — | | 8.00 | — | |
| | CAB-O-JET (trade name) 300 (*2) | 4.00 | | — | — | |
| | C.I. Food Black 2 | — | | — | 4.00 | |
| | Glycerol | 14.00 | | 17.00 | 17.00 | |
| | Triethylene glycol | 4.00 | | — | — | |
| | Triethylene glycol-n-butyl ether | 3.00 | | — | — | |
| | Dipropylene glycol-n-propyl ether | — | | 2.00 | 2.00 | |
| | OLFIN (trade name) E1004 (*3) | 0.30 | | — | — | |
| | OLFIN (trade name) E1010 (*4) | — | | 1.00 | 1.00 | |
| | SUNNOL (trade name) NL-1430 (*5) | 0.50 | | — | — | |
| | Water | balance | | balance | balance | |
| | $K_a$ (ppm) | 204 | 497 (*K) | 307 | 204 | 412 (*K) |
| | $Li_a$ (ppm) | 30 | 30 | 8 | 141 | 141 |
| | $Na_a$ (ppm) | 54 | 54 | 38 | 13 | 13 |

States Patent Publications Nos. US20007/0100024, US2007/0100023 and US2016/0075880) so as to thereby obtain self-dispersible pigments, respectively, and aqueous pigment dispersions 2 to 5 containing the self-dispersible pigments, respectively were prepared.

Note that each of the aqueous pigment dispersions 1 to 10 was prepared such that the respective concentrations of the potassium ion, the lithium ion and the sodium ion in an ink obtained from each of the aqueous pigment dispersions 1 to 10 satisfied the above-described condition (Y). Specifically, the aqueous pigment dispersions 1 to 10 were prepared such that the respective concentrations of the potassium ion, the lithium ion and the sodium ion in inks Y-1a, Y-2, Y-4, M-1a, M-3 to M-6, C-1 and C-4 obtained therefrom had values indicated in TABLEs 2 to 4.

<Preparation of Chromatic Color Inks Using Pigment>

Components, except for the aqueous pigment dispersion, which were included in Chromatic Color Ink Composition (in each of TABLES 2 to 4) were mixed uniformly or homogeneously; and thus an ink solvent was obtained. Subsequently, the ink solvent was added to the liquid pigment dispersant, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus chromatic color inks Y-1a to Y-1g, Y-2 to Y-4, M-1a, M-1b, M-2 to M-6, C-1, C-2 and C-4 each using the pigment and indicated in one of TABLES 2 to 4 were obtained.

<Preparation of Chromatic Color Inks Using Dye>

Components which were included in Chromatic Color Ink Composition (TABLE 4) were mixed uniformly or homogeneously; and thus a mixture was obtained. After that, the obtained mixture was filtrated through a hydrophilic polytetrafluoroethylene (PTFE) type membrane filter (pore diameter: 0.20 μm) produced by TOYO ROSHI KAISHA, LTD., and thus chromatic color ink C-3 using the dye and indicated in TABLE 4 was obtained.

With respect to all the prepared inks, the respective concentrations of the potassium ion, the lithium ion and the sodium ion were measured by a cation chromatography apparatus. The results of the measurement are indicated in TABLEs 1 to 6. Further, each value of $K_a/(Li_a+Na_a+K_a)$, $K_c/(Li_c+Na_c+K_c)$ and Ra/Rc, calculated from measured concentrations of these ions, is indicated in TABLEs 1 to 6.

TABLE 2 (following)—LEGEND

*6: Aqueous dispersion of C.I. Pigment Yellow 74 (containing a resin dispersant).

*7: Aqueous dispersion of C.I. Pigment Yellow 74 processed by the method described in Published Japanese Translation of PCT International Publication for Patent Application No. 2009-515007 corresponding to United States Patent Publications Nos. US20007/0100024, US2007/0100023 and US2016/0075880.

*8: Aqueous dispersion of C.I. Pigment Yellow 155 (containing a resin dispersant).

*3: Surfactant produced by NISSHIN CHEMICAL CO., LTD.

*4: Surfactant produced by NISSHIN CHEMICAL CO., LTD.

*5: Surfactant; produced by LION SPECIALTY CHEMICALS CO., LTD.

*K: Intentionally added with the potassium ion.

Numerals in the table indicate the solid content amount for the aqueous pigment dispersion, and indicate the active ingredient amount for the surfactant.

TABLE 3 (following)—LEGEND

*9: Aqueous dispersion of C.I. Pigment Red 122 (containing a resin dispersant).

*10: Aqueous dispersion of C.I. Pigment Violet 19 processed by the method described in Published Japanese Translation of PCT International Publication for Patent Application No. 2009-515007 corresponding to United States Patent Publications Nos. US20007/0100024, US2007/0100023 and US2016/0075880.

*11: Aqueous dispersion of C.I. Pigment Red 202 (containing a resin dispersant).

*12: Aqueous dispersion of solid solution of C.I. Pigment Red 122/C.I. Pigment Violet 19 (containing a resin dispersant).

*13: Aqueous dispersion of solid solution of C.I. Pigment Red 202/C.I. Pigment Violet 19 (containing a resin dispersant).

*4: Surfactant produced by NISSHIN CHEMICAL CO., LTD.

*5: Surfactant; produced by LION SPECIALTY CHEMICALS CO., LTD.

*K: Intentionally added with the potassium ion.

Numerals in the table indicate the solid content amount for the aqueous pigment dispersion, and indicate the active ingredient amount for the surfactant.

TABLE 4 (following)—LEGEND

*14: Aqueous dispersion of C.I. Pigment Blue 15:3 (containing a resin dispersant).

*15: Aqueous dispersion of C.I. Pigment Blue 15:4 (containing a resin dispersant).

*3: Surfactant produced by NISSHIN CHEMICAL CO., LTD.

*5: Surfactant produced by LION SPECIALTY CHEMICALS CO., LTD.

Numerals in the table indicate the solid content amount for the aqueous pigment dispersion, and indicate the active ingredient amount for the surfactant.

TABLE 2

|  |  | Y-1a | Y-1b | Y-1c | Y-1d | Y-1e | Y-1f | Y-1g | Y-2 | Y-3 | Y-4 |
|---|---|---|---|---|---|---|---|---|---|---|---|
| Composition of Chromatic Color Ink (% by weight) | Aqueous Pigment Dispersion 1 (*6) |  |  |  | 4.50 |  |  |  | — | 4.50 | — |
|  | Aqueous Pigment Dispersion 2 (*7) |  |  |  | — |  |  |  | 4.50 | — | — |
|  | Aqueous Pigment Dispersion 3 (*8) |  |  |  | — |  |  |  | — | — | 4.50 |
|  | Glycerol |  |  |  | 21.00 |  |  |  | 21.00 | 20.00 | 21.00 |
|  | Diethylene glycol |  |  |  | — |  |  |  | — | 2.00 | — |
|  | Tripropylene glycol |  |  |  | 5.00 |  |  |  | 5.00 | — | 5.00 |
|  | Polyethylene glycol 200 |  |  |  | — |  |  |  | — | 8.00 | — |
|  | Triethylene glycol-n-butyl ether |  |  |  | 2.00 |  |  |  | 2.00 | — | 2.00 |
|  | Dipropylene glycol-n-propyl ether |  |  |  | — |  |  |  | — | 1.00 | — |
|  | Tripropylene glycol methyl ether |  |  |  | — |  |  |  | — | 1.00 | — |

TABLE 2-continued

|  | Y-1a | Y-1b | Y-1c | Y-1d | Y-1e | Y-1f | Y-1g | Y-2 | Y-3 | Y-4 |
|---|---|---|---|---|---|---|---|---|---|---|
| OLFIN (trade name) E1004 (*3) |  |  |  | 0.50 |  |  |  | 0.50 | — | — |
| OLFIN (trade name) E1010 (*4) |  |  |  | — |  |  |  | — | 1.00 | — |
| SUNNOL (trade name) NL-1430 (*5) |  |  |  | 0.50 |  |  |  | 0.50 | — | 0.50 |
| Water |  |  |  | balance |  |  |  | balance | balance | balance |
| $K_c$ (ppm) | 41 | 354 (*K) | 122 (*K) | 178 (*K) | 299 (*K) | 951 (*K) | 106 (*K) | 95 | 41 | 20 |
| $Li_c$ (ppm) | 29 | 29 | 29 | 29 | 29 | 29 | 29 | 121 | 29 | 254 |
| $Na_c$ (ppm) | 230 | 230 | 230 | 230 | 230 | 230 | 230 | 14 | 230 | 12 |

TABLE 3

|  |  | M-1a | M-1b | M-2 | M-3 | M-4 | M-5 | M-6 |
|---|---|---|---|---|---|---|---|---|
| Composition of Chromatic Color ink (% by weight) | Aqueous Pigment Dispersion 4 (*9) | 4.50 | 4.50 | — | — | — | — | — |
|  | Aqueous Pigment Dispersion 5 (*10) | — | — | 4.50 | — | — | — | — |
|  | Aqueous Pigment Dispersion 6 (*11) | — | — | — | 4.50 | — | — | — |
|  | Aqueous Pigment Dispersion 7 (*12) | — | — | — | — | 5.50 | — | — |
|  | Aqueous Pigment Dispersion 8 (*13) | — | — | — | — | — | — | 4.00 |
|  | C.I. Acid Red 289 | — | 1.00 | — | — | — | — | — |
|  | Glycerol | 17.00 | 17.00 | 17.00 | 17.00 | 17.00 | 17.00 |  |
|  | Tripropylene glycol methyl ether | 2.00 | 2.00 | 2.00 | 2.00 | 2.00 | 2.00 |  |
|  | OLFIN (trade name) E1010 (*4) | 0.20 | 0.20 | 0.20 | 0.20 | 0.20 | 0.20 |  |
|  | SUNNOL (trade name) NL-1430 (*5) | 1.00 | 1.00 | 1.00 | 1.00 | 1.00 | 1.00 |  |
|  | Water | balance | balance | balance | balance | balance | balance |  |
| $K_c$ (ppm) |  | 65 | 798 (*K) | 681 | 331 | 301 | 51 | 6 |
| $Li_c$ (ppm) |  | 485 | 485 | 199 | 196 | 216 | 344 | 32 |
| $Na_c$ (ppm) |  | 0 | 0 | 475 | 231 | 3 | 11 | 188 |

TABLE 4

|  |  | C-1 | C-2 | C-3 | C-4 |
|---|---|---|---|---|---|
| Composition of Chromatic Color Ink (% by weight) | Aqueous Pigment Dispersion 9 (*14) | 3.50 | 1.00 | — | — |
|  | Aqueous Pigment Dispersion 10 (*15) | — | — | — | 4.00 |
|  | C. I. Direct Blue 199 | — | — | 3.50 | — |
|  | Glycerol | 12.50 | 15.00 | 15.00 | 15.00 |
|  | Diethylene glycol | 3.00 | 3.00 | 3.00 | 3.00 |
|  | Triethylene glycol-n-butyl ether | 4.00 | 4.00 | 4.00 | 4.00 |
|  | OLFIN (trade name) E1010 (*4) | 0.50 | 0.50 | 0.50 | 0.50 |
|  | SUNNOL (trade name) NL-1430 | 3.00 | 3.00 | 3.00 | 3.00 |
|  | Water | balance | balance | balance | balance |
| $K_c$ (ppm) |  | 90 | 49 | 14 | 279 |
| $Li_c$ (ppm) |  | 35 | 13 | 230 | 152 |
| $Na_c$ (ppm) |  | 202 | 75 | 211 | 41 |

Examples 1-1 to 1-18 and Comparative Examples 1-1 to 1-5

<Construction of Ink Set for Ink-Jet Recording>

Examples 1-1 to 1-18 were each an example in which one kind of the chromatic color ink was used. As indicated in TABLE 5 (see below), the chromatic and achromatic color inks were combined to thereby construct ink sets for ink-jet recording.

<Evaluation of Ink Set for Ink-Jet Recording>

With respect to the ink sets of Examples 1-1 to 1-18 and Comparative Examples 1-1 to 1-5, the evaluation of bleeding was performed by the following method.

<Evaluation of Bleeding>

Evaluation samples were prepared as follows. That is, a background portion was formed with each of the chromatic color inks constituting the respective ink sets of examples 1-1 to 1-18 and comparative examples 1-1 to 1-5, and a line portion was formed with each of the achromatic color inks constituting the respective ink sets of examples 1-1 to 1-18 and comparative examples 1-1 to 1-5 on three types of regular paper sheets ("Rey Copy Paper" manufactured by INTERNATIONAL PAPER, "Business" manufactured by XEROX, and "Recycled Supreme" manufactured by XEROX), by using the digital multi-function center DCP-J4225N carried with the ink-jet printer and manufactured by BROTHER INDUSTRIES, LTD. With respect to the bleeding in the evaluation samples, Raggedness was measured by a handheld image analysis system "PIAS (trade name)-II" manufactured by QUALITY ENGINEERING ASSOCIATES INC. (QEA) and was evaluated according to the following evaluation criteria. The measurement of Raggedness was performed three times per each regular paper sheet in conformity with ISO-13660. As for the results of the measurements of each regular paper sheet, an average value of values obtained by three times measurements was rounded off all fractions. Further, "an average (Raggedness) of the three types of regular paper sheets" described in the following criteria for evaluation of bleeding was obtained as follows. That is, the respective average values of the three types of regular paper sheets (value before being rounded) were summed up; the summed value was divided three to obtain an average value of the results of the measurements of the three types of regular paper sheets; and the average value was rounded off all fractions. Here, the term "Raggedness (Rag)" means raggedness of a line as defined in ISO-13600, wherein a term "ragged line" means a meandering (waving, non-uniform or distorted) state as compared with an ideal line edge which should primarily be smooth and straight.

<Criteria for Evaluation of Bleeding>

A: Average Line Raggedness of the three types of regular paper sheets was less than 30.

B: Average Line Raggedness of the three types of regular paper sheets was in a range of 30 or more to less than 40.

C: Average Line Raggedness of the three types of regular paper sheets was 40 or more.

The composition and the results of evaluation of the respective ink sets of Examples 1-1 to 1-18 and Comparative Examples 1-1 to 1-5 are shown in TABLE 5.

TABLE 5

| | EXAMPLES | | | | | |
|---|---|---|---|---|---|---|
| | 1-1 | 1-2 | 1-3 | 1-4 | 1-5 | 1-6 |
| Achromatic color ink | Bk-1b | Bk-1c | Bk-2b | Bk-3 | Bk-2b | Bk-2a |
| $K_a$ (ppm) | 307 | 370 | 497 | 307 | 497 | 204 |
| $Li_a$ (ppm) | 80 | 0 | 30 | 8 | 30 | 30 |
| $Na_a$ (ppm) | 38 | 38 | 54 | 38 | 54 | 54 |
| $K_a/(Li_a + Na_a + K_a)$ | 0.72 | 0.91 | 0.86 | 0.87 | 0.86 | 0.71 |
| Chromatic color ink | Y-1b | Y-1c | Y-1d | Y-1e | Y-2 | Y-3 |
| $K_c$ (ppm) | 354 | 122 | 178 | 299 | 95 | 41 |
| $Li_c$ (ppm) | 29 | 29 | 29 | 29 | 121 | 29 |
| $Na_c$ (ppm) | 230 | 230 | 230 | 230 | 14 | 230 |
| $K_c/(Li_c + Na_c + K_c)$ | 0.58 | 0.32 | 0.41 | 0.54 | 0.41 | 0.14 |
| Ra/Rc | 1.24 | 2.84 | 2.10 | 1.61 | 2.10 | 5.07 |
| Bleeding | B | A | A | B | A | B |

| | EXAMPLES | | | | | |
|---|---|---|---|---|---|---|
| | 1-7 | 1-8 | 1-9 | 1-10 | 1-11 | 1-12 |
| Achromatic color ink | Bk-1a | Bk-1d | Bk-1a | Bk-1e | Bk-1b | Bk-1c |
| $K_a$ (ppm) | 307 | 450 | 307 | 307 | 307 | 370 |
| $Li_a$ (ppm) | 0 | 0 | 0 | 30 | 80 | 0 |
| $Na_a$ (ppm) | 38 | 38 | 38 | 56 | 38 | 38 |
| $K_a/(Li_a + Na_a + K_a)$ | 0.89 | 0.92 | 0.89 | 0.78 | 0.72 | 0.91 |
| Chromatic color ink | Y-4 | M-1a | M-3 | M-2 | M-4 | M-5 |
| $K_c$ (ppm) | 20 | 65 | 331 | 681 | 301 | 51 |
| $Li_c$ (ppm) | 254 | 485 | 196 | 199 | 216 | 344 |
| $Na_c$ (ppm) | 12 | 0 | 231 | 475 | 3 | 11 |
| $K_c/(Li_c + Na_c + K_c)$ | 0.07 | 0.12 | 0.44 | 0.50 | 0.58 | 0.13 |
| Ra/Rc | 12.71 | 7.67 | 2.02 | 1.56 | 1.24 | 7.00 |
| Bleeding | A | A | A | B | B | A |

| | EXAMPLES | | | | | |
|---|---|---|---|---|---|---|
| | 1-13 | 1-14 | 1-15 | 1-16 | 1-17 | 1-18 |
| Achromatic color ink | Bk-2b | Bk-1f | Bk-1c | Bk-4b | Bk-1c | Bk-3 |
| $K_a$ (ppm) | 497 | 307 | 370 | 412 | 370 | 307 |
| $Li_a$ (ppm) | 30 | 0 | 0 | 141 | 0 | 8 |
| $Na_a$ (ppm) | 54 | 58 | 38 | 13 | 38 | 38 |
| $K_a/(Li_a + Na_a + K_a)$ | 0.86 | 0.84 | 0.91 | 0.73 | 0.91 | 0.87 |
| Chromatic color ink | M-6 | C-1 | C-2 | C-3 | C-3 | C-4 |
| $K_c$ (ppm) | 6 | 90 | 49 | 14 | 14 | 279 |
| $Li_c$ (ppm) | 188 | 35 | 13 | 230 | 230 | 152 |
| $Na_c$ (ppm) | 32 | 202 | 75 | 211 | 211 | 41 |
| $K_c/(Li_c + Na_c + K_c)$ | 0.03 | 0.28 | 0.36 | 0.03 | 0.03 | 0.59 |
| Ra/Rc | 28.67 | 3.00 | 2.53 | 24.33 | 30.33 | 1.47 |
| Bleeding | A | A | A | B | A | B |

TABLE 5-continued

|  | COMPARATIVE EXAMPLES | | | | |
| --- | --- | --- | --- | --- | --- |
|  | 1-1 | 1-2 | 1-3 | 1-4 | 1-5 |
| Achromatic color ink | Bk-1g | Bk-1h | Bk-1i | Bk-1j | Bk-4a |
| $K_a$ (ppm) | 307 | 400 | 307 | 307 | 204 |
| $Li_a$ (ppm) | 379 | 0 | 0 | 121 | 141 |
| $Na_a$ (ppm) | 38 | 38 | 442 | 38 | 13 |
| $K_a/(Li_a + Na_a + K_a)$ | 0.42 | 0.91 | 0.41 | 0.66 | 0.57 |
| Chromatic color ink | Y-1f | Y-1f | Y-1g | M-1b | C-3 |
| $K_c$ (ppm) | 951 | 951 | 106 | 798 | 14 |
| $Li_c$ (ppm) | 29 | 29 | 29 | 485 | 230 |
| $Na_c$ (ppm) | 230 | 230 | 230 | 0 | 211 |
| $K_c/(Li_c + Na_c + K_c)$ | 0.79 | 0.79 | 0.29 | 0.62 | 0.03 |
| Ra/Rc | 0.53 | 1.15 | 1.41 | 1.06 | 19.00 |
| Bleeding | C | C | C | C | C |

As indicated in TABLE 5, the ink sets of Examples 1-1 to 1-18, each satisfying the above-described condition (X) $(K_a/(Li_a+Na_a+K_a)>0.7)$ and the above-described condition (Y) $(K_c/(Li_c+Na_c+K_c)<0.6)$, had satisfactory results in the evaluation of bleeding. In each of Examples 1-1 to 1-18, the total sum of the concentration of the potassium ion, the concentration of the lithium ion and the concentration of the sodium ion was in the range of 50 ppm to 2000 ppm, and the condition (A)(Ra/Rc>1.2) was satisfied.

In particular, the ink sets of Examples 1-2, 1-3, 1-5, 1-7 to 1-9, 1-12 to 1-15 and 1-17 in each of which the condition (X1) $(K_a/(Li_a+Na_a+K_a)>0.8)$ and the condition (Y1) $(K_c/(Li_c+Na_c+K_c)<0.5)$ were satisfied had quite satisfactory results in the evaluation of bleeding. Each of Examples 1-2, 1-3, 1-5, 1-7 to 1-9, 1-12 to 1-15 and 1-17 satisfied the above-described condition (A1) (Ra/Rc>2.0). Further, among Examples 1-2, 1-3, 1-5, 1-7 to 1-9, 1-12 to 1-15 and 1-17, each of Examples 1-2, 1-8, 1-12, 1-15 and 1-17 used the achromatic black ink Bk-1c or Bl-1d added with the potassium ion, and satisfied the condition (X2) $(K_a/(Li_a+Na_a+K_a)>0.9)$.

On the other hand, the ink sets of Comparative Examples 1-1 to 1-5 in each of which at least one of the condition (X) and the condition (Y) was not satisfied had unsatisfactory results in the evaluation of bleeding.

Examples 2-1 to 2-3

Examples 2-1 to 2-3 were each an example in which two or more kinds of the chromatic color ink were used. As indicated in TABLE 6 (see below), the chromatic and achromatic color inks were combined to thereby construct ink sets for ink-jet recording.

With respect to the ink sets of Examples 2-1 to 2-3, the evaluation of bleeding was performed in a similar manner as the ink sets of Examples 1-1 to 1-18 and Comparative Examples 1-1 to 1-5, except that the background portion was formed in a mixed color by using two or more kinds (colors) of the chromatic color inks in same amounts.

The compositions and the results of measurements and evaluations of the ink sets of Example 2-1 to 2-3 are indicated in TABLE 6 below.

TABLE 6

|  | EXAMPLES | | |
| --- | --- | --- | --- |
|  | 2-1 | 2-2 | 2-3 |
| Achromatic color ink | Bk-1a | Bk-1e | Bk-1a |
| $K_a$ (ppm) | 307 | 307 | 307 |
| $Li_a$ (ppm) | 0 | 30 | 0 |

TABLE 6-continued

|  | EXAMPLES | | | | | | |
| --- | --- | --- | --- | --- | --- | --- | --- |
|  | 2-1 | 2-2 | | | 2-3 | | |
| $Na_a$ (ppm) | 38 | 56 | | | 38 | | |
| $K_a/(Li_a + Na_a + K_a)$ | 0.89 | 0.78 | | | 0.89 | | |
| Chromatic color ink | Y-1a | M-2 | M-2 | C-1 | Y-1a | M-2 | C-1 |
| $K_c$ (ppm) | 41 | 681 | 681 | 90 | 41 | 681 | 90 |
| $Li_c$ (ppm) | 29 | 199 | 199 | 35 | 29 | 199 | 35 |
| $Na_c$ (ppm) | 230 | 475 | 475 | 202 | 230 | 475 | 202 |
| $K_{ct}/(Li_{ct} + Na_{ct} + K_{ct})$ | 0.44 | 0.46 | | | 0.41 | | |
| Ra/Rc | 2.02 | 1.70 | | | 2.17 | | |
| Bleeding | A | B | | | A | | |

As indicated in TABLE 6, Examples 2-1 to 2-3, satisfying the condition (X) and the condition (Z) $(K_{ct}/(Li_{ct}+Na_{ct}+K_{ct})<0.6)$ each had a satisfactory result in the evaluation of bleeding. Further, each of Examples 2-1 to 2-3 satisfied the above-described condition (A) (Ra/Rc>1.2). In particular, Examples 2-1 and 2-3 each satisfying the above-described condition $(X1)(K_a/(Li_a+Na_a+K_a)>0.8)$ and the above-described condition $(Z1)(K_{ct}/(Li_{ct}+Na_{ct}+K_{ct})<0.5)$ each had quite an excellent result in the evaluation of bleeding. Furthermore, each of Examples 2-1 to 2-3 satisfied the above-described condition (A1) (Ra/Rc>2.0).

As described above, the ink set related to the present teaching is capable of effectively preventing the bleeding from occurring at the boundary portion between the recording portion formed by using the achromatic color ink and the recording portion formed by using the chromatic color ink. The usage of the ink set related to the present teaching is not particularly limited, and is widely applicable to a variety of kinds of ink-jet recording.

What is claimed is:

1. An ink set for ink-jet recording comprising:
   an achromatic color ink containing potassium ion and at least one of lithium ion and sodium ion; and
   a chromatic color ink containing at least one selected from the group consisting of: the potassium ion, the lithium ion and the sodium ion,
   wherein the ink set satisfies the following conditions (X) and (Y):

$$K_a/(Li_a+Na_a+K_a)>0.7 \quad \text{Condition (X):}$$

in the condition (X),
$K_a$: concentration (ppm) of the potassium ion in the achromatic color ink,
$Li_a$: concentration (ppm) of the lithium ion in the achromatic color ink, Na$_a$: concentration (ppm) of the sodium ion in the achromatic color ink; and $$K_c/(Li_c+Na_c+K_c)<0.6 \qquad \text{Condition (Y):}$$

in the condition (Y),
K$_c$: concentration (ppm) of the potassium ion in the chromatic color ink,
Li$_c$: concentration (ppm) of the lithium ion in the chromatic color ink,
Na$_c$: concentration (ppm) of the sodium ion in the chromatic color ink.

2. The ink set for ink-jet recording according to claim 1, wherein the ink set satisfies the following conditions (X1) and (Y1):

$$K_a/(Li_a+Na_a+K_a)>0.8 \qquad \text{Condition (X1):}$$

in the condition (X1),
K$_a$: the concentration (ppm) of the potassium ion in the achromatic color ink,
Li$_a$: the concentration (ppm) of the lithium ion in the achromatic color ink,
Na$_a$: the concentration (ppm) of the sodium ion in the achromatic color ink; and $$K_c/(Li_c+Na_c+K_c)<0.5 \qquad \text{Condition (Y1):}$$

in the condition (Y1),
K$_c$: the concentration (ppm) of the potassium ion in the chromatic color ink,
Li$_c$: the concentration (ppm) of the lithium ion in the chromatic color ink,
Na$_c$: the concentration (ppm) of the sodium ion in the chromatic color ink.

3. The ink set for ink-jet recording according to claim 1, wherein the ink set satisfies the following condition (X2):

$$K_a/(Li_a+Na_a+K_a)>0.9 \qquad \text{Condition (X2):}$$

in the condition (X2),
K$_a$: the concentration (ppm) of the potassium ion in the achromatic color ink,
Li$_a$: the concentration (ppm) of the lithium ion in the achromatic color ink,
Na$_a$: the concentration (ppm) of the sodium ion in the achromatic color ink.

4. The ink set for ink-jet recording according to claim 1, wherein
the achromatic color ink is a black ink containing a black pigment and water; and
the chromatic color ink is at least one water-based chromatic color ink selected from the group consisting of:
a water-based yellow ink containing a yellow pigment and the water;
a water-based magenta ink containing a magenta pigment and the water; and
a water-based cyan ink containing a cyan pigment and the water.

5. The ink set for ink-jet recording according to claim 1, wherein
the achromatic color ink is a water-based black ink containing a self-dispersible carbon black, a surfactant and water; and
the chromatic color ink is at least one water-based chromatic color ink selected from the group consisting of:
a water-based yellow ink containing a yellow pigment, a resin dispersant, a surfactant and the water;
a water-based magenta ink containing a magenta pigment, a resin dispersant, a surfactant and the water, and
a water-based cyan ink containing a cyan pigment, a resin dispersant, a surfactant and the water.

6. The ink set for ink-jet recording according to claim 1, wherein the achromatic color ink is a water-based black ink containing a self-dispersible carbon black and water;
and the chromatic color ink is a water-based chromatic color ink containing a self-dispersible chromatic pigment and the water.

7. The ink set for ink-jet recording according to claim 6, wherein the chromatic color ink is at least one water-based chromatic color ink selected from the group consisting of:
a water-based yellow ink containing a self-dispersible yellow pigment and the water;
a water-based magenta ink containing a self-dispersible magenta pigment and the water; and
a water-based cyan ink containing a self-dispersible cyan pigment and the water.

8. The ink set for ink-jet recording according to claim 4, wherein
the yellow pigment includes an azo pigment;
the magenta pigment includes a quinacridone pigment; and
the cyan pigment includes a phthalocyanine pigment.

9. The ink set for ink-jet recording according to claim 8, wherein
the yellow pigment includes at least one of C.I. pigment yellow 74 and C.I. pigment yellow 155;
the magenta pigment includes at least one selected from the group consisting of: C.I. pigment violet 19, C.I. pigment red 122, C.I. pigment red 202, and a solid solution containing at least two kinds of magenta pigments among three kinds of magenta pigments which are C.I. pigment violet 19, C.I. pigment red 122 and C.I. pigment red 202; and
the cyan pigment includes at least one of C.I. pigment blue 15:3 and C.I. pigment blue 15:4.

10. The ink set for ink-jet recording according to claim 4, wherein
a total sum of the concentration of the potassium ion, the concentration of the lithium ion and the concentration of the sodium ion in the water-based black ink is in a range of 50 ppm to 2000 ppm;
a total sum of the concentration of the potassium ion, the concentration of the lithium ion and the concentration of the sodium ion in the water-based yellow ink is in a range of 50 ppm to 2000 ppm;
a total sum of the concentration of the potassium ion, the concentration of the lithium ion and the concentration of the sodium ion in the water-based magenta ink is in a range of 50 ppm to 2000 ppm; and
a total sum of the concentration of the potassium ion, the concentration of the lithium ion and the concentration of the sodium ion in the water-based cyan ink is in a range of 50 ppm to 2000 ppm.

11. The ink set for ink-jet recording according to claim 1, satisfying the following condition (A):

$$Ra/Rc>1.2 \qquad \text{Condition (A):}$$

wherein the Ra and the Rc in the condition (A) are represented by the following formulae (1) and (2):

$$Ra=K_a/(Li_a+Na_a+K_a) \qquad \text{formula (1):}$$

in the formula (1),
K$_a$: the concentration (ppm) of the potassium ion in the achromatic color ink,
Li$_a$: the concentration (ppm) of the lithium ion in the achromatic color ink, Na$_a$: the concentration (ppm) of the sodium ion in the achromatic color ink; and $$Rc = K_c/(Li_c + Na_c + K_c) \quad \text{formula (2)}:$$

in the formula (2),

K$_c$: the concentration (ppm) of the potassium ion in the chromatic color ink,

Li$_c$: the concentration (ppm) of the lithium ion in the chromatic color ink,

Na$_c$: the concentration (ppm) of the sodium ion in the chromatic color ink.

12. The ink set for ink-jet recording according to claim 1, satisfying the following condition (A1):

$$Ra/Rc > 2.0 \quad \text{Condition (A1)}:$$

wherein the Ra and the Rc in the condition (A1) are represented by the following formulae (1) and (2):

$$Ra = K_a/(Li_a + Na_a + K_a) \quad \text{formula (1)}:$$

in the formula (1),

K$_a$: the concentration (ppm) of the potassium ion in the achromatic color ink, Li$_a$: the concentration (ppm) of the lithium ion in the achromatic color ink, Na$_a$: the concentration (ppm) of the sodium ion in the achromatic color ink; and $$Rc = K_c/(Li_c + Na_c + K_c) \quad \text{formula (2)}:$$

in the formula (2),

K$_c$: the concentration (ppm) of the potassium ion in the chromatic color ink,

Li$_c$: the concentration (ppm) of the lithium ion in the chromatic color ink,

Na$_c$: the concentration (ppm) of the sodium ion in the chromatic color ink.

13. The ink set for ink-jet recording according to claim 1, comprising the chromatic color ink as a plurality of chromatic color inks, wherein all the plurality of chromatic color inks satisfy the condition (Y).

14. An ink set for ink-jet recording comprising:

an achromatic color ink containing potassium ion and at least one of lithium ion and sodium ion; and two or more chromatic color inks each of which containing at least one selected from the group consisting of: the potassium ion, the lithium ion and the sodium ion, wherein the ink set satisfies the following conditions (X) and (Z):

$$K_a/(Li_a + Na_a + K_a) > 0.7 \quad \text{Condition (X)}:$$

in the condition (X),

K$_a$: concentration (ppm) of the potassium ion in the achromatic color ink,

Li$_a$: concentration (ppm) of the lithium ion in the achromatic color ink,

Na$_a$: concentration (ppm) of the sodium ion in the achromatic color ink; and $$K_{ct}/(Li_{ct} + Na_{ct} + K_{ct}) < 0.6 \quad \text{Condition (Z)}:$$

in the condition (Z),

K$_{ct}$: a total sum of concentrations (ppm) of the potassium ion in the two or more chromatic color inks;

Li$_{ct}$: a total sum of concentrations (ppm) of the lithium ion in the two or more chromatic color inks;

Na$_{ct}$: a total sum of concentrations (ppm) of the sodium ion in the two or more chromatic color inks.

15. A method for producing the ink set for ink-jet recording as defined in claim 1, the method comprising:

preparing an achromatic color ink so as to satisfy the condition (X);

measuring concentrations of potassium ion, lithium ion and sodium ion, respectively, in the prepared achromatic color ink;

preparing a chromatic color ink so as to satisfy the condition (Y);

measuring concentrations of the potassium ion, the lithium ion and the sodium ion, respectively, in the prepared chromatic color ink; and combining the achromatic color ink and the chromatic color ink.

\* \* \* \* \*